United States Patent [19]

Martin

[11] Patent Number: 4,856,738
[45] Date of Patent: Aug. 15, 1989

[54] ADJUSTABLE SEATING ARRANGEMENT FOR AIRCRAFT

[75] Inventor: John C. Martin, Herts, England
[73] Assignee: British Aerospace Public Limited Company, Hatfield, United Kingdom
[21] Appl. No.: 164,960
[22] Filed: Mar. 7, 1988
[30] Foreign Application Priority Data
Mar. 7, 1987 [GB] United Kingdom ............... 8705393
[51] Int. Cl.$^4$ ............................................. B64D 11/06
[52] U.S. Cl. .............................. 244/122 R; 248/430; 410/105
[58] Field of Search .................... 244/122 R; 105/345; 410/77, 80, 84, 101, 104, 105, 106, 112, 113, 115, 116; 248/429, 430, 503, 503.1

[56] References Cited

U.S. PATENT DOCUMENTS

| | | | |
|---|---|---|---|
| 1,962,789 | 6/1934 | Simpson et al. | 248/430 |
| 2,139,174 | 12/1938 | Saunders | 248/430 |
| 2,647,558 | 8/1953 | Rappl | 248/430 |
| 4,376,522 | 3/1983 | Banks | 410/105 |
| 4,493,470 | 1/1985 | Engel | 410/105 |
| 4,723,732 | 2/1988 | Gorges | 410/105 |

FOREIGN PATENT DOCUMENTS

| | | | |
|---|---|---|---|
| 0494880 | 11/1983 | European Pat. Off. | |
| 0021933 | 4/1986 | European Pat. Off. | |
| 965976 | 10/1982 | U.S.S.R. | 212/229 |
| 1212925 | 2/1986 | U.S.S.R. | 212/229 |

Primary Examiner—Sherman D. Basinger
Assistant Examiner—Thomas J. Brahan
Attorney, Agent, or Firm—Cushman, Darby & Cushman

[57] ABSTRACT

An adjustable seating system for a vehicle, particularly an aircraft, providing means for readily adapting the seating layout in an aircraft cabin to vary passenger density where a plurality of seating units are mounted upon a pair of longitudinal seat rails. Each seating unit incorporates a seat adjustment and locking system comprising a pair of interconnected sprocket wheels arranged to be in driving engagement with a related one of the seat rails so that the seating units can be moved to selected locations without physical separation from the track. Sprocket locking means, when engaged, restrains the seat against horizontal movement and reacts induced fore and aft flight loads obviating the need for separate seat rail engaging restraint means.

3 Claims, 7 Drawing Sheets

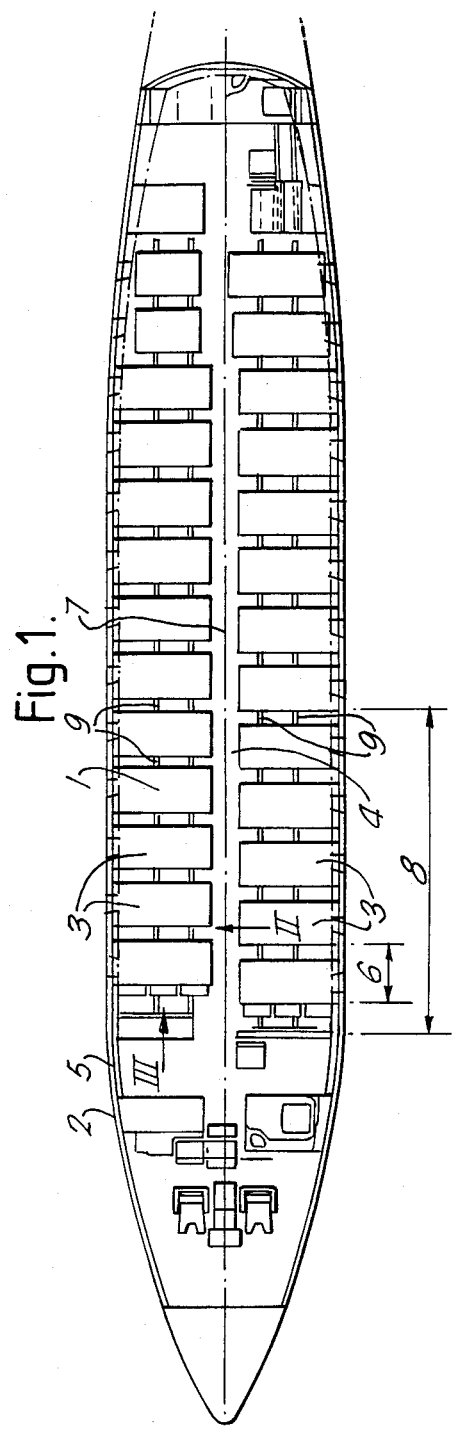
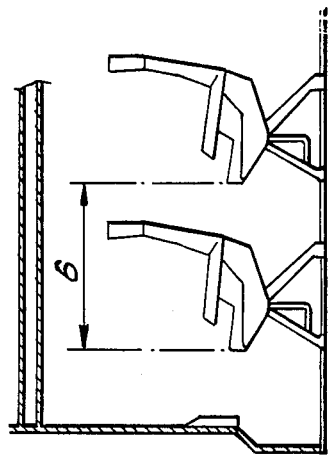

ADJUSTABLE SEATING ARRANGEMENT FOR AIRCRAFT

This invention relates to passenger seating arrangements for aircraft. More particularly it provides means for readily adapting the seating layout in an aircraft cabin to vary passenger density.

Airlines require high utilisation of their aircraft and it is uneconomic for an airliner to remain grounded for many hours in any twenty four hour period. One means for achieving high utilisation is the conversion of the aircraft from its scheduled service role during daylight hours to charter operation at night. However, charter operations such as the package holiday business naturally necessitate higher passenger densities than scheduled services and thus there is a need to adapt the aircraft seating arrangements to accommodate those higher densities. This involves the introduction of additional seating which can only be achieved by a reduction in seat pitch, that is the fore and aft separation between adjacent seats rows. Since this currently necessitates manual detachment and repositioning of each seat or seat unit this is an onerous and time-consuming operation.

In an aircraft passenber cabin, it is commonplace for two or three passenger seat configurations to be mounted upon a common seat structure arrangement aligning with and engaging longitudinally extending seat rails mounted upon the floor or an underlying floor support structure. The seat to rail attachments generally comprise rail engaging feet for reacting pitching moments, a deployable plunger for reacting fore and aft flight loads and an anti-rattle device to minimise or prevent in-service chatter between the feet and the rail. Conventional feet comprise a shank portion engaging the seat structure terminating in a frusto-conical base portion engaging the rail. Each rail, of well known form, includes a passageway extending longitudinally therethrough whose lateral cross-section conforms substantially to the frusto-conical base portion and a series of equally pitched circular holes of diameter similarly conforming to that of the base portion extends between the passageway and the rail upper surface each pair of holes interconnected along a longitudinal centre line datum by a parallel slot of width at least equivalent to the foot shank diameter. This arrangement consequentially provides a combination of circular apertures into which the feet are inserted and lips under which the frusto-conical base engages when the seat is moved forwards or rearwards one half pitch into locking engagement with the rail. The number of feet, associated with a particular seat assembly, depends upon the loading characteristics but their fore and aft spacing will always conform with the rail configuration. Similarly, the fore and aft restraint, usually a deployable plunger, is of diameter conforming to the circular apertures in the rail with which it is adjacently positioned in a fore and aft sense to engage when the feet are moved into locking engagement with the rail.

It will be appreciated that the re-arrangement of a complement of seats with this known system will be an onerous labour intensive and time-consuming activity necessitating, in the close confines of a passenger cabin, disengagement of the anti-rattle devices and fore and aft restraints, which may not be easily accessible, physical disengagement of the seat from the rail to its new position and subsequent re-engagement.

One prior art arrangement is known, namely European Patent Application No. 0215495 (Boeing/Gorges) illustrating a seating system for a passenger aircraft or the like whereby the seats can be quickly and effectively moved to different locations to provide different seating capacity. In this arrangement each seating unit has a traction wheel assembly, comprising at least two traction wheels, each of which engages a related one of the two longitudinal seat rails. Each traction wheel has a peripheral portion with a plurality of protrusions so as to match positioning and spacing of the openings in the related track and by which means, after disengagement of associated seat locking assemblies, rotation of the traction wheels, which are interconnected for simultaneous operation, moves the seating unit to selected locations without its physical separation from the rails. In this prior art arrangement each seating unit includes at least two mounting and locking assemblies each of which operatively engages a related one or the two tracks and is adapted to engage appropriate portions of the track to impart vertical and fore and aft restraint but which, by levered interconnection associated with each seat unit may be disengaged for seat relocation.

The adjustable seating arrangement of the present invention is similarly adapted for use in a passenger vehicle, particularly a passenger aircraft cabin but whereby a track engaging traction or sprocket wheel is further adapted to be locked against rotation when the seat unit is in its desired location to effect the desired fore and aft restraint, thus obviating the need for a separate track engaging locking arrangement.

According to the present invention there is provided an adjustable seating system adapted for use in a passenger vehicle, for example a passenger aircraft, said system comprising:

two or more parallel, spaced apart seat mounting rails extending longitudinally through at least a portion of a passenger compartment;

seat locating and engaging means included in said seat mounting rails for maintaining two or more seating units in spaced relationship along said rails;

a plurality of seating units mounted upon said mounting rails;

seat locating and engaging means comprising a passageway extending longitudinally throughout the length of said rails, equally pitched apertures interconnecting said passageway with an upper surface of said rails and longitudinal parallel guideway slots interconnecting said apertures;

each of said seating units including retaining foot members fixedly connected to said seating unit and positioned for engaging each said foot member within said rails.

adjustment and locking means associated with each seat of said seating units comprising a sprocket wheel assembly including at least two operatively interconnected sprocket wheels, each of which engages a related one of said two seat mounting rails, each of said sprocket wheels rotatably mounted about a transverse horizontal axis of rotation and including a peripheral portion having a plurality of radially disposed spigots protruding outwardly therefrom arranged such that they will match with the spacings of the equally pitched apertures in said seat mounting rails, said sprocket wheel assembly further including sprocket wheel engaging and locking means;

said sprocket wheel assembly so located upon said seating unit with respect to said seat mounting rail such that with the sprocket wheels engaging their related tracks and rotated in either a clockwise or counterclockwise direction said radially disposed spigots will engage with the apertures in said seat mounting rails causing the seating unit to be moved in either a forwardly or rearwardly direction;

whereby the seating units can be moved to desired locations by unlocking said sprocket wheel assembly, actuating said adjustment means to move said seating unit to its new location and relocking said sprocket wheel assembly.

One embodiment of the present invention will now be described, by way of example only, and with reference to the accompanying drawings in which:

FIG. 1 comprises a diagrammatic plan view of a typical seating arrangement in an aircraft passenger cabin.

FIG. 2 is a diagrammatic side elevation in the aircraft passenger cabin looking outboard in direction of arrow II in FIG. 1 illustrating the disposition of two seat rows.

Figure 3:
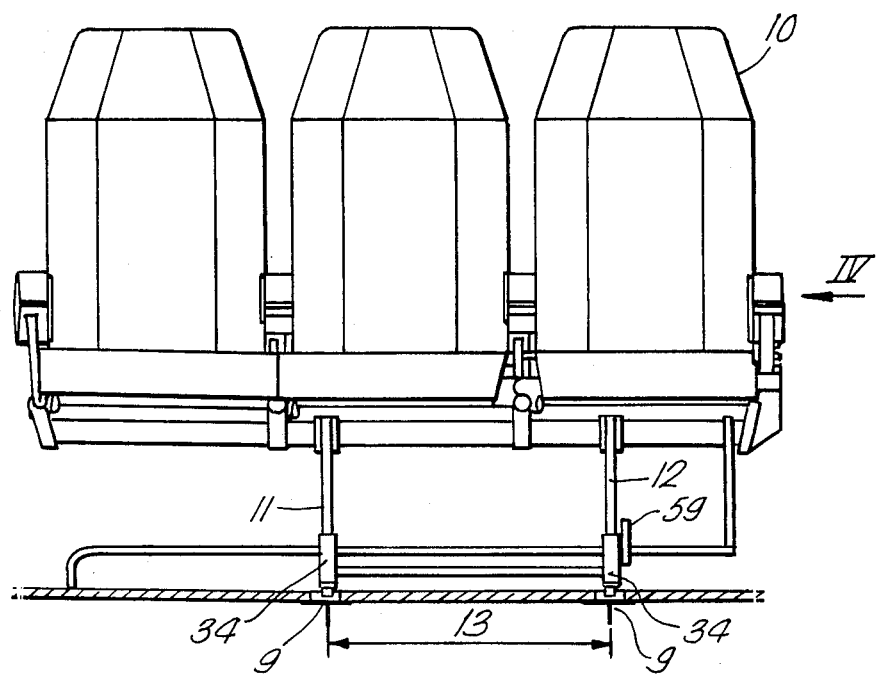
FIG. 3 illustrates a front elevation on a typical installed seat unit arrangement looking aft, viewed in direction of arrow III in FIG. 1.

Referring to the drawings, FIG. 1 illustrates, in diagrammatic plan view a typical cabin seating arrangement 1 in a passenger transport aircraft fuselage 2. Rows of seats 3 are arranged transversely across the fuselage with an intervening gangway 4 between the port and starboard seat rows. Except where access is required to entrance doors 5, galleys, toilets, etc., seat rows are disposed relative to each other in a fore and aft sense at selected pitch settings. The precise fore and aft separation 6 as further illustrated in FIG. 2 in the seat pitch between the seat rows generally varies between 32" and 36", the particular pitch setting being determined by various factors, predominantly passenger density. Thus the seat attachments to the cabin floor 7 must be such that the seats are readily movable to accommodate change of pitch when required. In the arrangement illustrated in FIG. 1, the seat pitches are shown equally spaced along the cabin but in an alternative arrangement a forward cabin portion 8 could, for example, be of more open pitch and thus of less passenger density. This is frequently the case where an airline introduces a 'business class'.

Figure 4:
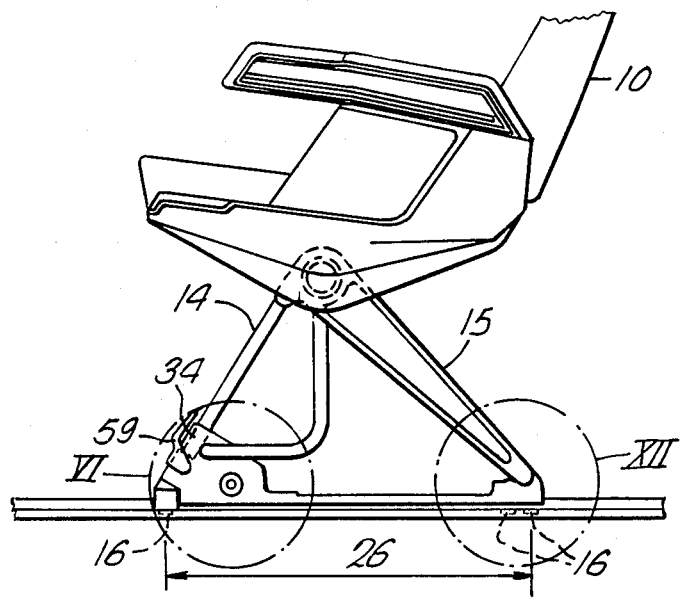
FIG. 4 illustrates a side elevation on the installed unit arrangement looking outboard in direction of arrow IV in FIG. 3.

The seats are located to seat rails 9 extending longitudinally through the passenger cabin, the rails incorporated into the floor support structure. FIGS. 3 and 4 illustrate a triple seat unit 10 having inner and outer leg assemblies 12 and 11 in alignment with seat rails 9 at a fixed lateral spacing 13. Although the triple seat arrangement is illustrated here the disposition of the legs is equally applicable to single or twin seat arrangements. Each leg assembly includes a forward strut 14 and a rearward strut 15 each including attachment studs 16 for engaging the respective seat rail.

Figure 14:
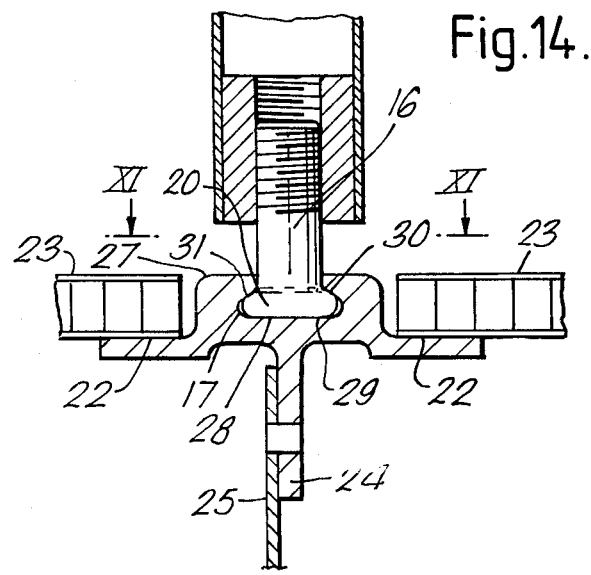
FIG. 14 is a cross-section through a seat rail installation illustrating a typical seat leg engagement.
Figure 11:
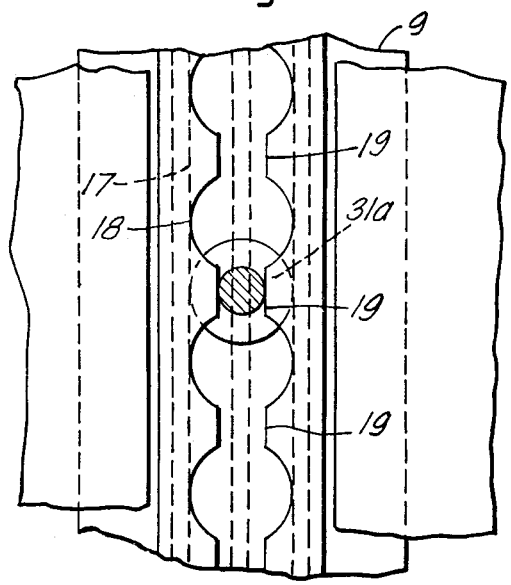
FIG. 11 is a sectional plan view on the seat rail viewed along a line XI—XI in FIG. 14.

The attachments are more clearly illustrated by reference to FIGS. 11 and 14. Each seat rail 9 of well known form includes a longitudinally extending guideway slot 17 throughout the length of each rail, equally pitched holes 18 extending vertically between the guideway slot and the seat rail upper surface 27 and longitudinal slots 19 interconnecting the vertical holes 18. The slot 19 and the guideway slot 17 are configured to conform substantially to the shoulder portion 20 of the attachment studs 16 which protrude from each of the leg struts 14 and 15 and the holes 18 are of clearance diameter to accommodate the stud shoulder 20. The seat rail further includes side flanges 22 for seating floor panels 23 and a vertical flange 24 for attachment to the seat rail support structure 25.

Figure 12:
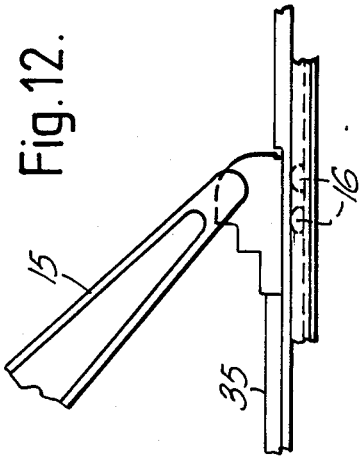
FIG. 12 is a local detail showing a typical seat to floor attachment at the rear leg portion.

The holes 18 are equally spaced at 1".0 pitch and the stud centres 26 on the seat are located such that they align with matching hole centres at any location along the rail; where for structural reasons an additional stud may be required as indicated at FIG. 12 the studs are appropriately spaced to ensure conformity with the rail. To install and positively engage the seat on the rail, it is positioned at its desired fore and aft location such that the studs 16 locate in the corresponding holes 18, the stud face 28 seating on the lower surface 29 of the guideway slot 17. Once positioned the seat is moved forwards or rearwards, as required, until the shoulder surface 31 engages under the lip 30, that is at a position intermediate two adjacent holes 18 resulting in positive engagement of the seat indicated as 31a in FIG. 11. The seat is restrained against inadvertent horizontal seat movement which might result in a seat detachment, by means to be described which, in addition to its function of restraint, will also react fore and aft flight loads whilst the studs 16 will react pitching moments and vertical loads. The method of restraint forms a novel feature of the present invention. Whilst it may be a simple task to reposition a small number of seats by manually disengaging each seat from its track and relocating at its new position this is too onerous and time consuming when there is need to convert a major portion, if not the whole complement of seats from a close pitch configuration to a wider pitch or vice versa. The cumulative movement of seats will be considerable.

The arrangement of the present invention provides one preferred solution to this problem as exemplified by reference to FIGS. 4–10 inclusive in which the seat rails of known configuration are adapted, without physical modification, to additionally serve as racks for engaging sprocket assemblies 32 rotatably mounted to each seat unit and by which means rotation of the sprocket in a clockwise or anti-clockwise sense, as required, will cause the seat to move in a forwardly or rearwardly direction to the desired location. The sprocket assemblies 32 and the seat attachment studs 16 are so relatively located in a fore and aft sense that when the sprocket engages any particular hole 18 in the seat rail, the stud 16 will be properly engaged within the rail as previously described. When in its desired location the seat is locked against inadvertent horizontal movement by sprocket locking means such that the sprocket, in locked engagement with the seat rail, is restrained against rotation thus preventing horizontal seat shift and reacting fore and aft flight loads.

Figure 5:
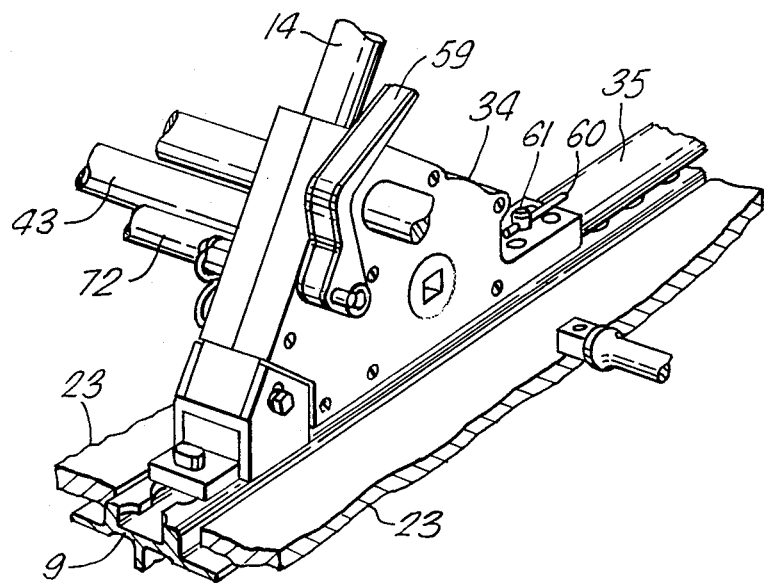
FIG. 5 is a pictorial representation of the seat adjustment and locking installation of the seat of FIG. 3 and 4 as viewed from above and to one side.

Referring to FIGS. 3, 4 and 5 each seating unit incorporates at the lower extremity of each forward leg strut 14 a seat adjustment and locking assembly 34 and, although this embodiment is described in relation to a single seat rail engagement it is equally applicable at each pair of seat rails and the respective sprocket rotations co-ordinated by interconnection to obviate any possibility of jamming and misalignment. The only distinction between the inner and outer operating mechanism is that locking and unlocking of the assemblies and actuation is initiated at the inboard rail position, ie, conveniently adjacent a gangway for ready access.

As illustrated in FIGS. 6 through 10, each adjustment and locking assembly 34, basically comprises a sprocket assembly 32 rotatably mounted within a sprocket casing assembly 33 located, as illustrated at the forward lower corner of the passenger seat, only the forward strut 14 and a horizontal stay 35 being shown for reasons of clarity.

Figure 9:
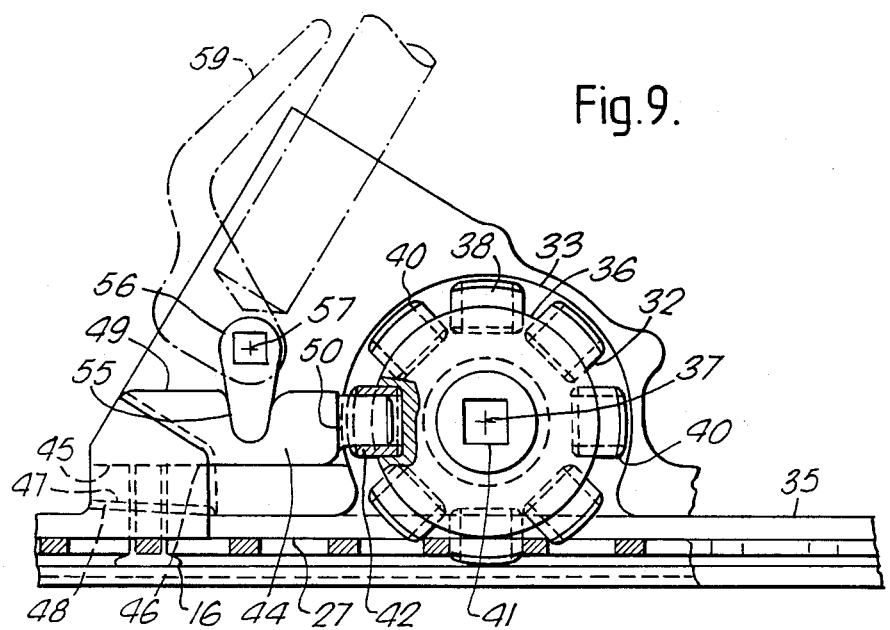
FIG. 9 is a further side elevation on the seat adjustment and locking installation but with certain detail removed and part sectioned to more clearly illustrate the mechanism.
Figure 10:
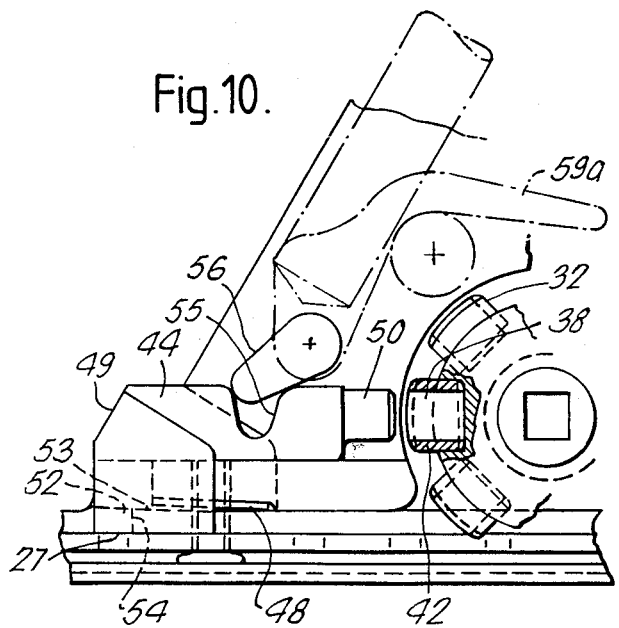
FIG. 10 is a part side elevation on the installation, illustrating in conjunction with FIG. 9, the operation of the seat locking mechanism.

The sprocket 32 is more clearly illustrated in FIGS. 9 and 10 and comprises six radially disposed cylindrical spigots 38 mounted upon a sprocket wheel 36 about a horizontal axis of rotation, the sprocket wheel including a pivot axle 37 such that the sprocket can be rotatably mounted within a sprocket casing assembly 33, the front half of which has been removed in FIGS. 9 and 10 for reasons of clarity. The spigots 38 are of clearance diameter with respect to the diameter of the holes 18 in the seat rails 9 and chamfered at 40 to provide a suitable lead in for sprocket/seat rail engagement. Each spigot includes a bore hole 42a extending therethrough for engaging sprocket locking means 44 to be later described. The sprocket pivot axle 37 includes extending therethrough at one end a square recess 41 a square peg 42. This enables an interconnection to be made between the two sprocket assemblies on each seat by means of a torque lube 43 and the square recess located on the inboard side of the seat and therefore adjacent the gangway enables an operator to readily apply a torque wrench or power tool to effect rotation of the sprocket wheel.

By this arrangement, the disposition and dimensions of the sprocket wheel 32 and the spigots 38 are such that the effective spacing of the spigots corresponds to the linear pitch of the holes in the seat rail and clockwise or anti-clockwise rotation of the sprocket wheels will effect corresponding linear movement of the seat in a fore and aft sense.

Extending forwardly within the sprocket casing assembly 33 is a spacer block 45 having a horizontal upper surface 46 for slidably engaging a sprocket locking means 44 and an inclined forward lower surface 47 incorporating a friction pad 48. Protruding downwardly from the spacer block 45 is the forward seat attachment stud 16.

Figure 6:
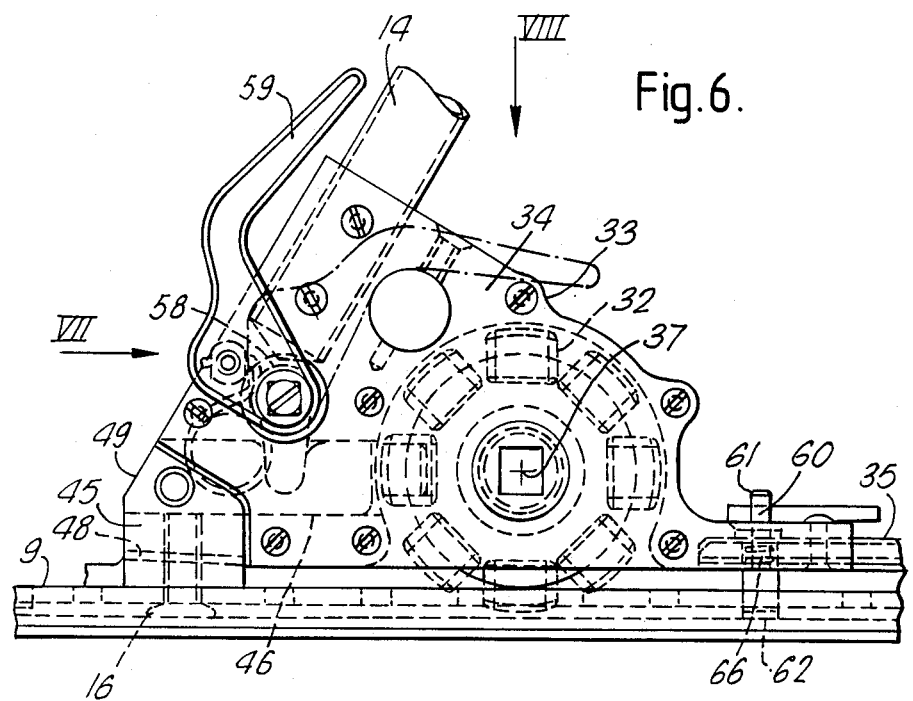
FIG. 6 illustrates a side elevation on the seat adjustment and locking installation of the present invention indicated as Detail VI in FIG. 4.
Figure 7:
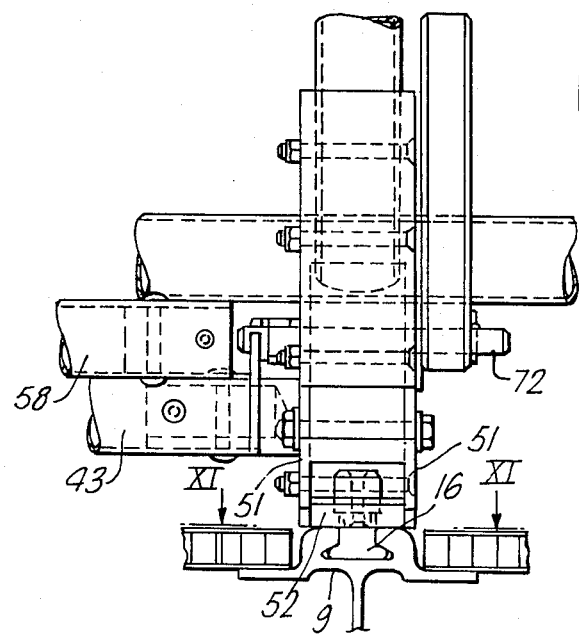
FIG. 7 is an end elevation on the inboard leg seat adjustment and locking installation viewed in direction of arrow VII in FIG. 6.

Sprocket locking means 44 comprises a locking foot assembly 49 slidably engaging the spacer block 46 and including a horizontal draw bolt 50 movable from a locking position when the bolt engages the bore hole 42 in an aligned spigot 38, as illustrated in FIG. 9, to an unlocked position as illustrated in FIG. 10 for movement of the seat in a forwardly or rearwardly direction. The spacer block further includes vertical side webs 51 which lie adjacent each side of the spacer block 45 and are interconnected at their lower end by a base web 52 having a lower surface seating upon and in slidable engagement with the upper surface 27 of the seat rails 9 and an inclined upper surface 53 for engaging with the friction pad 48. The base web includes a longitudinal slot 54 aligned with the forward stud 16 to accommodate fore and aft movement of the locking foot assembly. Each draw bolt 50 incorporates a tapered vertical slot 55 for engaging a correspondingly tapered lever 56 pivotally located within the sprocket casing assembly 33 about a common axis of rotation 57 each lever 56 being interconnected by a torque tube 58 for simultaneous operation. As illustrated in FIGS. 6, 9 and 10 the levers are actuated by a locking handle 59 which is located on the inboard side of the seat only, ie, adjacent the gangway and, when the seat is in its locked position the locking handle 59 is itself locked by a quick-release fastener 60.

FIGS. 9 and 10 illustrate the actuation of the seat locking mechanism. As the locking handle 59 is rotated in a clockwise sense to the unlocked position 59a, associated angular displacement of the lever 56 cause horizontal movement of the locking foot assembly 49 and disengagement of the draw bolt 50 from the spigot 38. Conversely when locking of the sprocket is to be effected, anti-clockwise movement of the handle will drive the draw bolt into locking engagement and simultaneously the co-operation of the inclined upper surface 53 of the locking foot assembly 49 with the friction pad 48 will constitute a wedge effect to prevent chatter between adjacent components.

Figure 8:
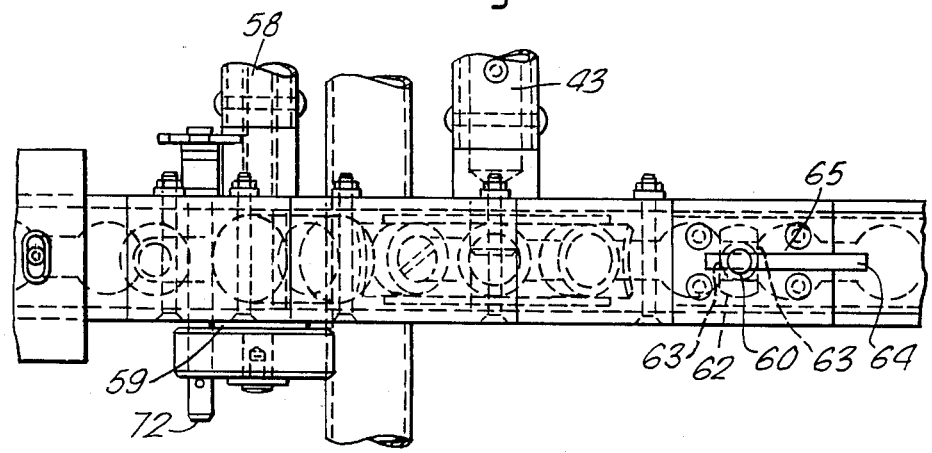
FIG. 8 illustrates a plan view on the same installation viewed in direction of Arrow VIII in FIG. 6.

The seat adjustment and locking assembly 34 further includes a seat uplock assembly 60 as particularly illustrated in FIGS. 6 and 8. The function of this uplock is to ensure that as a particular seat unit is moved along the track by means of sprocket rotation, one half pitch fore or aft movement of the seat will disengage the studs 16 from locking engagement with the track 9 and into alignment with the holes 18 in the track. In other words there will, in that position, be no vertical restraint so that if, inadvertently a seat is tipped forwards or rearwards it is in danger of being disengaged from the rail. To overcome this possibility the uplock assembly is so positioned in a fore and aft sense such that its uplock pin 61 lies intermediate two of the holes 18 in the track. By this means, when the studs 16 are in alignement with the holes 18, the uplock pin head 62 will be engaged under the lip 30 to react any tipping of the seat. The uplock pin head 62 is of overall diameter corresponding to that of the stud 16 but includes two parallel flats 63 to give a clearance width with respect to the longitudinal slots 19 in the seat rails. The uplock pin 61 includes a bar 64 which is held in position within a detent 65k by spring loading means 66. The uplock is overcome by rotation of the uplock pin 61 through 90° only when the seat is removed from the aircraft.

As each seating unit is fitted with the seat adjustment and locking arrangement of the present invention, the seating capacity of an aircraft cabin can be readily adapted. To carry out the operation the quick release fastener associated with each seating unit is removed and the respective locking handle 59 rotated clockwise to effect withdrawal of each pair of draw bolts 50. The fore and aft restraint is thus removed and by appropriate means, for example, a power tool the sprocket wheels 32 are rotated, their meshing engagement with the seat rails effecting forward or rearward movement of each seat unit in sequence dependent on the desired seating arrangement. With each seat positioned in its required location each locking handle 59 is rotated counter clockwise driving the draw bolts into sprocket locking engagement and the handle secured by quick release pin 72. By this novel combined seat adjustment and locking arrangement, each seating unit can be instantaneously repositioned in locking engagement with the seat rails and restrained against fore and aft and vertical in-flight loads.

Figure 13:
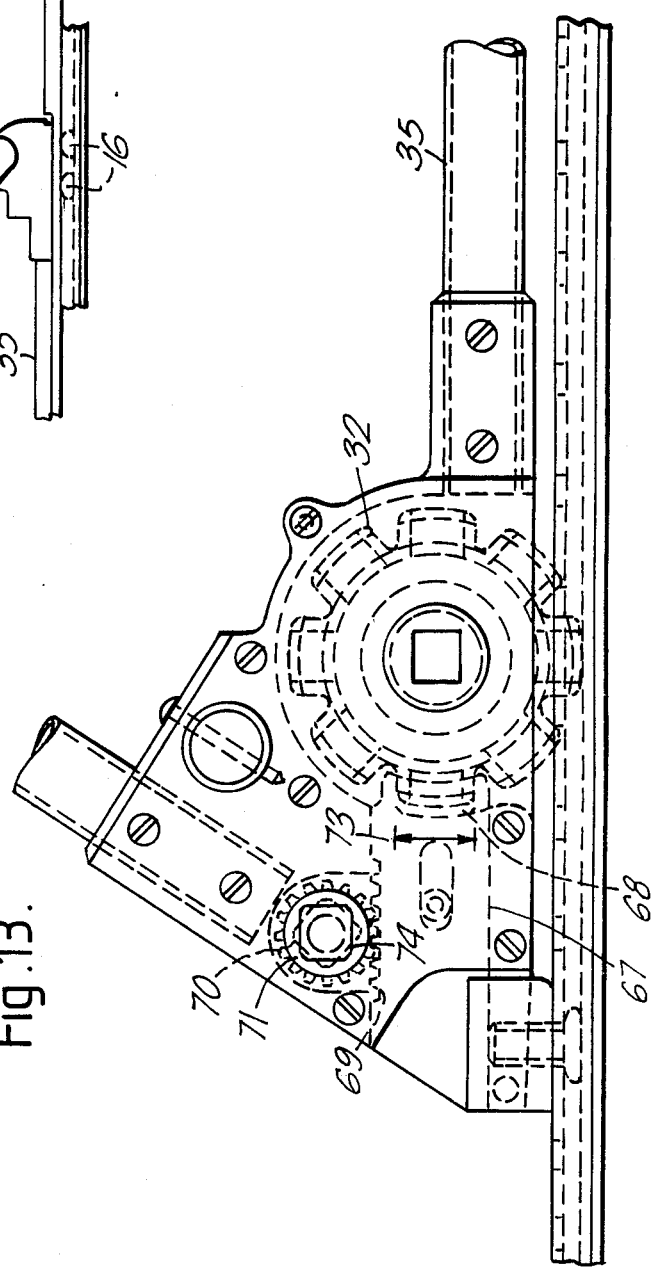
FIG. 13 is a further embodiment of a seat adjustment and locking installation.

FIG. 13 illustrate a further embodiment of the arrangement of the present invention which is substantially identical in detail except that the draw bolt of the earlier preferred embodiment is replaced by a plate 67 having a fork end 68 whose internal jaw width 73 correspond substantially with the sprocket spigot 38. The plate upper surface incorporates an integral gear rack 69 engaging a pinion wheel 70 a torque tube 71 interconnecting the pinion at each seat leg position. At least the inner, ie, adjacent the gangway, pinion incorporates a square peg 74 for engaging, for example, a power tool for effecting locking or unlocking of the sprocket.

I claim:

1. An adjustable seating system adapted for use in a passenger vehicle, for example an aircraft, in which two or more parallel spaced apart floor mounted seat rails extend longitudinally through at least a portion of a passenger carrying compartment and a plurality of seating units are mounted upon said seat rails;

each of said rails including a series of equally spaced interconnected openings along their length for fixedly engaging and retaining said seating units at any selected lengthwise location, each of said seating units including seat position adjustment means comprising a sprocket wheel assembly including at least two operatively interconnected sprocket wheels each of which engages said openings in a related one of said mounting rails and sprocket wheel locking means, said sprocket wheels having a circumferential portion incorporating a plurality of radially disposed spigots extending outwardly therefrom in which each of said spigots is substantially cylindrical and incorporates a concentric bore over at least a portion of its length for engaging said sprocket wheel locking means, said sprocket wheel locking means including a draw bolt having a spigot engaging shank portion for engaging the concentric bore in an aligned and adjacent one of said spigots so that when said shank portion is moved into locking engagement with said spigot said sprocket wheel is restrained against rotation and said seat against forward or rearward displacement.

whereby the seating units can be moved to desired locations by unlocking said sprocket wheel assembly, actuating said adjustment means to move said seating unit to its new location and relocking said sprocket wheel assembly.

2. An adjustable seating system according to claim 1 in which the sprocket wheels are so configured that when a first spigot is in positioning engagement with an opening in said seat rail a second spigot is substantially in alignment with the shank portion of said draw bolt, said first spigot imparting fore and aft restraint to said seating units when said shank portion is in locking engagement with said second spigot.

3. A seating unit for a vehicle including seat adjustment means and locking means for use with an adjustable seating means and locking means for use with an adjustable seating system in a passenger vehicle, for example an aircraft, said adjustment means comprising a sprocket wheel assembly including at least two operatively interconnected sprocket wheels for engaging a related one of two seat mounting rails, each of said sprocket wheels having a circumferential portion incorporating a plurality of radially disposed spigots extending outwardly therefrom in which each of said spigots is substantially cylindrical and incorporates a concentric bore over at least a portion of its length for engaging said locking means, said locking means including a draw bolt having a spigot engaging shank portion for engaging said concentric bore in an aligned and adjacent one of said spigots and restraining said sprocket wheel against rotation.

* * * * *